US012443402B2

(12) United States Patent
Huang et al.

(10) Patent No.: US 12,443,402 B2
(45) Date of Patent: Oct. 14, 2025

(54) FIRMWARE UPDATE APPLICATION INSTALLING METHOD AND EMBEDDED DEVICE THEREOF

(71) Applicant: Wistron NeWeb Corporation, Hsinchu (TW)

(72) Inventors: Shang-Peng Huang, Hsinchu (TW); Cheng-Jung Wen, Hsinchu (TW); Wen-Jin Lee, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 150 days.

(21) Appl. No.: 18/179,435

(22) Filed: Mar. 7, 2023

(65) Prior Publication Data

US 2023/0315431 A1    Oct. 5, 2023

(30) Foreign Application Priority Data

Mar. 31, 2022 (TW) .................................. 111112640

(51) Int. Cl.
*G06F 8/65* (2018.01)
*G06F 8/61* (2018.01)

(52) U.S. Cl.
CPC . *G06F 8/65* (2013.01); *G06F 8/61* (2013.01)

(58) Field of Classification Search
CPC ........... G06F 8/61; G06F 8/65; G06F 8/60–76
USPC .......................................................... 717/169
See application file for complete search history.

(56) References Cited

U.S. PATENT DOCUMENTS

| 6,977,868 B2* | 12/2005 | Brewer | G04G 21/00 368/46 |
| 8,910,139 B2* | 12/2014 | Li | H04L 9/3247 717/172 |
| 8,910,868 B1* | 12/2014 | Wade | G06F 8/65 235/449 |
| 9,524,158 B2* | 12/2016 | Li | G06F 8/61 |
| 10,437,581 B1* | 10/2019 | Patil | G06F 8/65 |
| 10,813,169 B2* | 10/2020 | Perdomo | H04W 88/08 |
| 10,904,331 B2* | 1/2021 | Fan | H04W 4/50 |

(Continued)

FOREIGN PATENT DOCUMENTS

| CN | 102567352 A | 7/2012 |
| CN | 107346239 A | 11/2017 |
| CN | 114253558 A | 3/2022 |

*Primary Examiner* — Matthew J Brophy
(74) *Attorney, Agent, or Firm* — McClure, Qualey & Rodack, LLP

(57) ABSTRACT

A firmware update application installing method for installing a firmware update application to a mobile device is implemented in an embedded device. The embedded device stores a plurality of the firmware update applications and a distinguishing program. The firmware update applications conform to a plurality of file formats, respectively, and an operating system of the mobile device corresponds to one of the file formats. The firmware update application installing method includes performing a device connecting step for connecting the embedded device to the mobile device, an application selecting step for configuring the distinguishing program to select one of the firmware update applications that conforms to the one of the file formats according to the operating system, and an application installing step for transmitting the selected one of the firmware update applications from the embedded device to the mobile device for installation.

20 Claims, 7 Drawing Sheets

(56) References Cited

U.S. PATENT DOCUMENTS

| | | | | |
|---|---|---|---|---|
| 11,297,688 B2* | 4/2022 | Perdomo | | H04W 16/20 |
| 2003/0151982 A1* | 8/2003 | Brewer | | H04M 1/2757 |
| | | | | 368/46 |
| 2004/0221147 A1* | 11/2004 | Tseng | | G06F 8/65 |
| | | | | 713/1 |
| 2008/0040713 A1* | 2/2008 | Subbakrishna | | G06F 8/65 |
| | | | | 717/173 |
| 2009/0172658 A1* | 7/2009 | Wood | | G06F 8/61 |
| | | | | 717/174 |
| 2009/0210569 A1* | 8/2009 | Lusetti | | G06F 13/385 |
| | | | | 710/16 |
| 2011/0103609 A1* | 5/2011 | Pelland | | H04H 20/95 |
| | | | | 381/74 |
| 2013/0138718 A1* | 5/2013 | Mallur | | G06F 8/60 |
| | | | | 709/220 |
| 2013/0219381 A1* | 8/2013 | Lovitt | | G06F 8/65 |
| | | | | 717/173 |
| 2013/0262626 A1* | 10/2013 | Bozek | | H04L 67/10 |
| | | | | 709/217 |
| 2014/0215457 A1* | 7/2014 | Gava | | H04L 67/1095 |
| | | | | 709/201 |
| 2015/0193217 A1* | 7/2015 | Xiang | | G06F 8/61 |
| | | | | 717/174 |
| 2015/0242340 A1* | 8/2015 | Ishikawa | | G06F 8/61 |
| | | | | 719/321 |
| 2016/0231804 A1* | 8/2016 | Bulusu | | G06F 1/3234 |
| 2016/0246585 A1* | 8/2016 | Li | | G06F 8/65 |
| 2019/0296979 A1* | 9/2019 | Gupta | | G06N 3/08 |
| 2019/0297671 A1* | 9/2019 | Perdomo | | H04L 41/082 |
| 2019/0324736 A1* | 10/2019 | Kubecka | | G06F 11/1433 |
| 2020/0067919 A1* | 2/2020 | Patwardhan | | H04L 63/1425 |
| 2020/0089488 A1* | 3/2020 | Yu | | H04L 63/0869 |
| 2020/0114753 A1* | 4/2020 | Biderman | | B60R 16/02 |
| 2020/0228599 A1* | 7/2020 | Fan | | H04W 4/50 |
| 2020/0285752 A1* | 9/2020 | Wyatt | | G06F 21/566 |
| 2020/0314107 A1* | 10/2020 | Joshi | | H04L 63/10 |
| 2020/0371777 A1* | 11/2020 | Zhang | | G06F 8/654 |
| 2021/0176083 A1* | 6/2021 | Chiavetta | | H04W 12/069 |
| 2021/0176822 A1* | 6/2021 | Perdomo | | H04W 88/08 |
| 2022/0417016 A1* | 12/2022 | Oh | | H04L 9/0894 |
| 2023/0289444 A1* | 9/2023 | Ermey | | G06F 21/552 |
| 2024/0078466 A1* | 3/2024 | Sharma | | G06F 16/951 |
| 2024/0111595 A1* | 4/2024 | Ying | | H04L 67/34 |
| 2024/0160424 A1* | 5/2024 | Kristensson | | H04W 4/70 |

* cited by examiner

FIRMWARE UPDATE APPLICATION INSTALLING METHOD AND EMBEDDED DEVICE THEREOF

RELATED PATENT APPLICATION

This application claims the benefit of priority to Taiwan Patent Application No. 111112640, filed on Mar. 31, 2022. The entire content of the above identified application is incorporated herein by reference.

BACKGROUND

Technical Field

The present disclosure relates to an application installing method and an electronic device thereof, and more particularly, to a firmware update application installing method and an embedded device thereof.

Description of Related Art

Devices with embedded system currently update their firmware by downloading and installing, in a mobile phone, a firmware update application from a phone app store like Google Play Store or Apple App Store, and through the mobile phone, the firmware update application downloads the newest version of the firmware. User needs to manually search for the firmware update application of the device in the phone app store, and download the correct version of the firmware update application. Moreover, user can only download the firmware update application when there is cellular network available. As for the developer end, a firmware update application must go through a lengthy examination and approval process before hitting the store, plus the cost on application validation.

In view of this, the market lacks a way to install a firmware update application that bypasses phone app stores, and thus this is an issue to be resolved by the related industry.

SUMMARY

It is an object of the present disclosure to provide a firmware update application installing method for installing a firmware update application to a mobile device. The firmware update application installing method includes performing a device connecting step, an application selecting step, and an application installing step. The device connecting step includes connecting a web server of an embedded device to the mobile device. The embedded device stores a plurality of the firmware update applications, and the plurality of firmware update applications respectively conform to a plurality of file formats. The mobile device has an operating system, and the operating system corresponds to one of the plurality of file formats. The application selecting step includes configuring the web server to receive a selection command from the mobile device and select one of the plurality of firmware update applications that conforms to the one of the plurality of file formats according to the selection command. The application installing step includes configuring the embedded device to transmit the selected one of the plurality of firmware update applications to the mobile device for installation.

It is another object of the present disclosure to provide a firmware update application installing method for installing a firmware update application to a mobile device. The firmware update application installing method includes performing a device connecting step, an application selecting step, and an application installing step. The device connecting step includes connecting an embedded device to the mobile device. The embedded device stores a plurality of the firmware update applications and a distinguishing program, and the plurality of firmware update applications respectively conform to a plurality of file formats. The mobile device has an operating system, and the operating system corresponds to one of the plurality of file formats. The application selecting step includes configuring the distinguishing program to select one of the plurality of firmware update applications that conforms to the one of the plurality of file formats according to the one of the plurality of file formats which the operating system corresponds to. The application installing step includes configuring the embedded device to transmit the selected one of the plurality of firmware update applications to the mobile device for installation.

It is yet another object of the present disclosure to provide an embedded device for installing a firmware update application to a mobile device having an operating system. The embedded device includes a memory device and a web server. The memory device stores a plurality of the firmware update applications, and the plurality of firmware update applications respectively conform to a plurality of file formats. The operating system of the mobile device corresponds to one of the plurality of file formats. The web server is connected to the memory device and is for connecting to the mobile device. When the web server is connected to the mobile device and receives a selection command from the mobile device, the web server, according to the selection command, selects one of the plurality of firmware update applications that conforms to the one of the plurality of file formats from the plurality of firmware update applications stored in the memory device, and transmits the selected one of the plurality of firmware update applications to the mobile device so the mobiles device installs the selected one of the plurality of firmware update applications.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
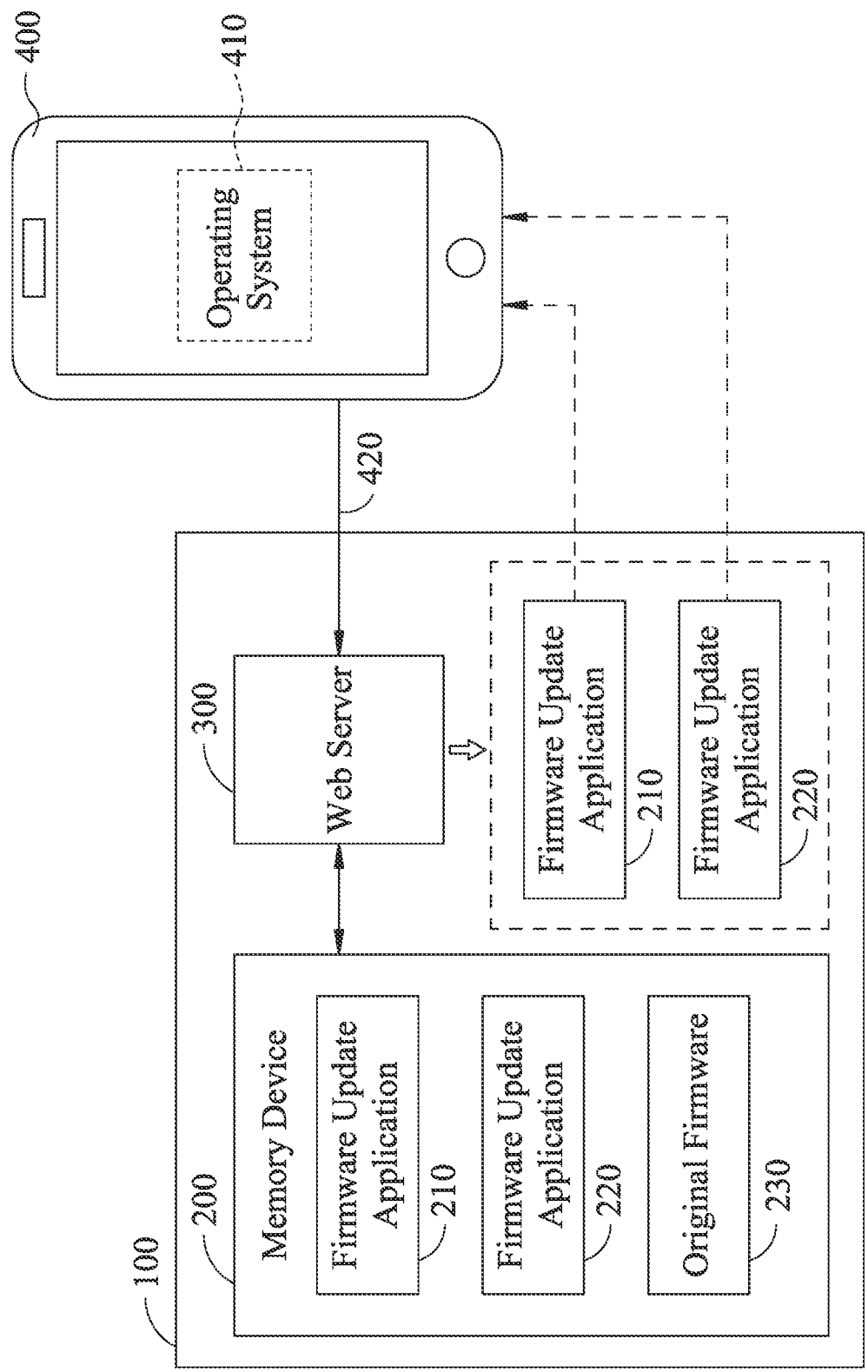
FIG. 1 is a schematic diagram illustrating an embedded device connected to a mobile device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, an embedded device 100 according to a first embodiment of the present disclosure connects to a mobile device 400 and includes a memory device 200 and a web server 300.

The memory device 200 stores two firmware update applications 210, 220 and an original firmware 230, and the two firmware update applications 210, 220 respectively conform to two file formats. In other words, the file format of the firmware update application 210 is different from the file format of the firmware update application 220. In other embodiments, the memory device 200 stores a plurality of the firmware update applications that respectively conform to a plurality of file formats, and the present disclosure does not limit the number of the firmware update applications or the number of the file formats.

The web server 300 is electrically connected to the memory device 200 and signally connected to the mobile device 400 for installing one of the two firmware update applications 210, 220 to the mobile device 400. In specific, the embedded device 100 can be a Bluetooth headphone, a dash-cam recorder, a smart watch, or an electronic device with an embedded system. The mobile device 400 can be a mobile phone, a notebook computer, or a tablet computer and has an operating system 410. Moreover, the web server 300 of the embedded device 100 and the mobile device 400 can be signally connected by a wireless network (Wi-Fi), Bluetooth, ZigBee, or Near Field Communication (NFC). It is to be noted that the two file formats can respectively be an APK file format and an IPA file format. The operating system 410 of the mobile device 400 corresponds to one of the APK file format and the IPA file format. The firmware update application 210 conforms to the APK file format, and the firmware update application 220 conforms to the IPA file format. In one embodiment, the firmware update application 210 and the firmware update application 220 are applications of the same kind, for example, the firmware update application 210 and the firmware update application 220 are two copies of a firmware update application for the original firmware 230 that conform to or have different file formats, but the present disclosure is not limited thereto.

When the web server 300 of the embedded device 100 is signally connected to the mobile device 400 and receives a selection command 420 from the mobile device 400, the web server 300 selects one of the firmware update applications 210, 220 that conforms to the file format which the operating system 410 corresponds to from the two firmware update applications 210, 220 stored in the memory device 200. The selection command 420 is generated by the mobile device 400 based on information about the file format which the operating system 410 corresponds to.

In particular, when the operating system 410 of the mobile device 400 is an Android operating system, the web server 300 selects the firmware update application 210 that conforms to the APK file format, which corresponds to the Android operating system, according to the selection command 420 and transmits the selected firmware update application 210 to the mobile device 400 for installation. Thus, the original firmware 230 can be updated through the firmware update application 210 installed in the mobile device 400. Similarly, when the operating system 410 of the mobile device 400 is an iOS operating system, the web server 300 selects the firmware update application 220 that conforms to the IPA file format, which corresponds to the iOS operating system, according to the selection command 420 and transmits the selected firmware update application 220 to the mobile device 400 so the mobile device 400 installs the selected firmware update application 220. The original firmware 230 can then be updated through the firmware update application 220 installed in the mobile device 400. In one embodiment, after the mobile device 400 obtains from the embedded device 100 and installs one of the firmware update applications 210, 220 that conforms to the file format which its operating system 410 corresponds to, the embedded device 100 can be wirelessly controlled by the one of firmware update applications 210, 220 to perform actions like changing background wallpaper of the smart watch, watching and accessing recorded videos of the dash-cam recorder, adjusting volume or switching music tracks on the Bluetooth headphone, etc., but the present disclosure is not limited thereto.

As such, the embedded device 100 receives the selection command 420 from the mobile device 400 through the web server 300. According to the selection command 420 (corresponding to the type of the operating system 410), the web server 300 then selects and transmits the firmware update application 210 or the firmware update application 220 to the mobile device 400. Hence, there is no need for the developer to launch the firmware update applications 210, 220 in the phone app stores like Google Play Store or Apple App Store, and so the cost and procedure for the launch can be saved on the developer end. Through the embedded device 100 of the present disclosure, the user can directly obtain the firmware update application 210 or the firmware update application 220 to be installed in the mobile device 400, without relying on the phone app store, and update the original firmware 230, and so the time the user spends on the installation process is reduced.

Figure 2:
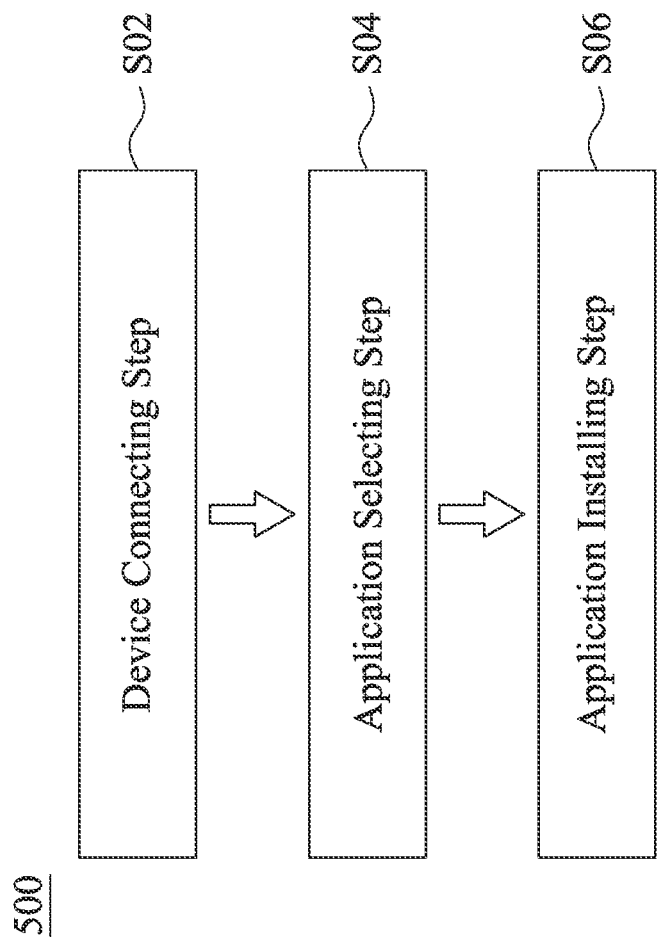
FIG. 2 is a schematic flow chart of a firmware update application installing method according to a second embodiment of the present disclosure.
Figure 3:
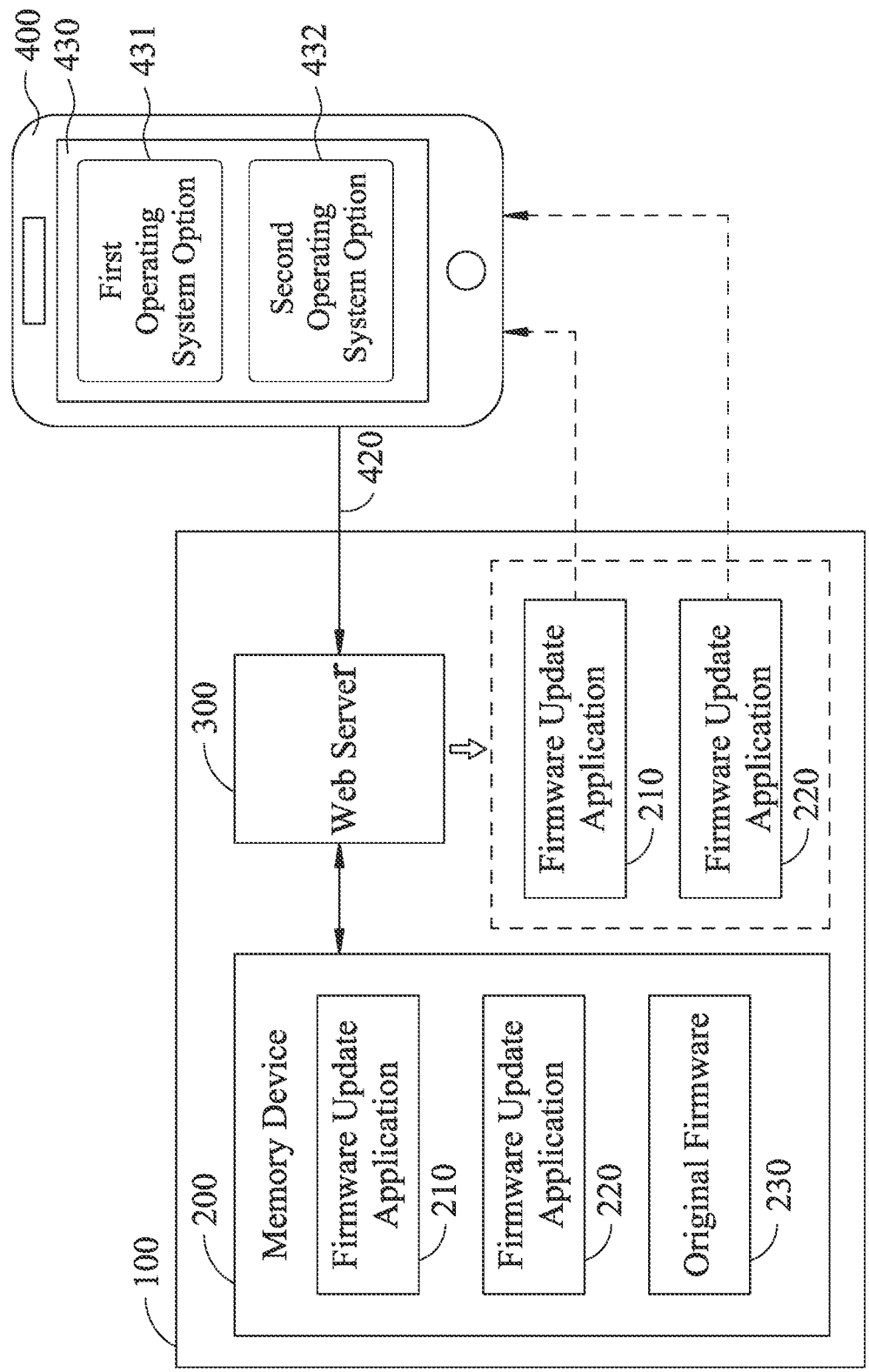
FIG. 3 is a schematic diagram illustrating an embedded device and a mobile device in the firmware update application installing method of FIG. 2.

Referring to FIG. 1 to FIG. 3, a firmware update application installing method 500 according to a second embodiment of the present disclosure can be implemented in the embedded device 100 for installing one of the two firmware update applications 210, 220 to the mobile device 400. The firmware update application installing method 500 includes performing a device connecting step S02, an application selecting step S04, and an application installing step S06.

The device connecting step S02 includes signally connecting the web server 300, which is established by the embedded device 100, to the mobile device 400. The web server 300 can be a processing module such as, for example but not limited to, one or more Central Processing Unit (CPU), Micro Control Unit (MCU), Digital Signal Processor (DSP), or other electronic components or Integrated Circuits (IC) capable of signal processing, logic computation, and electronic device control. In other embodiment, the web server 300 can also be a server application that provides a webpage.

The application selecting step S04 includes driving or configuring the web server 300 to receive the selection command 420 from the mobile device 400 and select, according to the selection command 420, the firmware update application having the file format which the operating system 410 corresponds to from the two firmware update applications 210, 220 stored in the memory device 200. As shown in FIG. 3, after the mobile device 400 is signally connected to the web server 300, the web server 300 displays a system selection interface 430 through the mobile device 400. The system selection interface 430 includes a first operating system option 431 and a second operating system option 432. The application selecting step S04 further includes configuring or driving the mobile device 400 to generate the selection command 420 based on a selection of the first operating system option 431 or the second operating system option 432 on the system selection interface 430 according to the file format which the operating system 410 corresponds to.

More particularly, if the operating system 410 of the mobile device 400 is the Android operating system, the mobile device 400 generates the selection command 420 based on the first operating system option 431 which is selected according to the Android operating system. Subsequently, the mobile device 400 transmits the selection command 420 to the web server 300, and the selection command 420 contains information on the operating system 410 being the Android operating system. In addition, if the operating system 410 of the mobile device 400 is iOS operating system, a selection of the second operating system option 432 is selected according to the iOS operating system, and the mobile device 400 generates the selection command 420 containing information on the operating system 410 being iOS operating system and transmits the selection command 420 to the web server 300.

In the application selecting step S04, the web server 300 is able to select the firmware update application 210 having the APK file format or the firmware update application 220 having the IPA file format for the mobile device 400 according to the selection command 420.

The application installing step S06 includes driving or configuring the embedded device 100 to transmit the firmware update application 210 having APK file format or the firmware update application 220 having IPA file format to the mobile device 400, so that the mobile device 400 installs the firmware update application 210 or the firmware update application 220. Thus, the firmware update application installing method 500 of the present disclosure selects the firmware update application that corresponds to the operating system 410 of the mobile device 400 according to the selection command 420 which contains various information, so that the mobile device 400 installs correct firmware update application. As such, the downloading and installing of firmware update application to the mobile device 400 can be done by the mobile device 400 itself without going through the phone app store.

Figure 4:
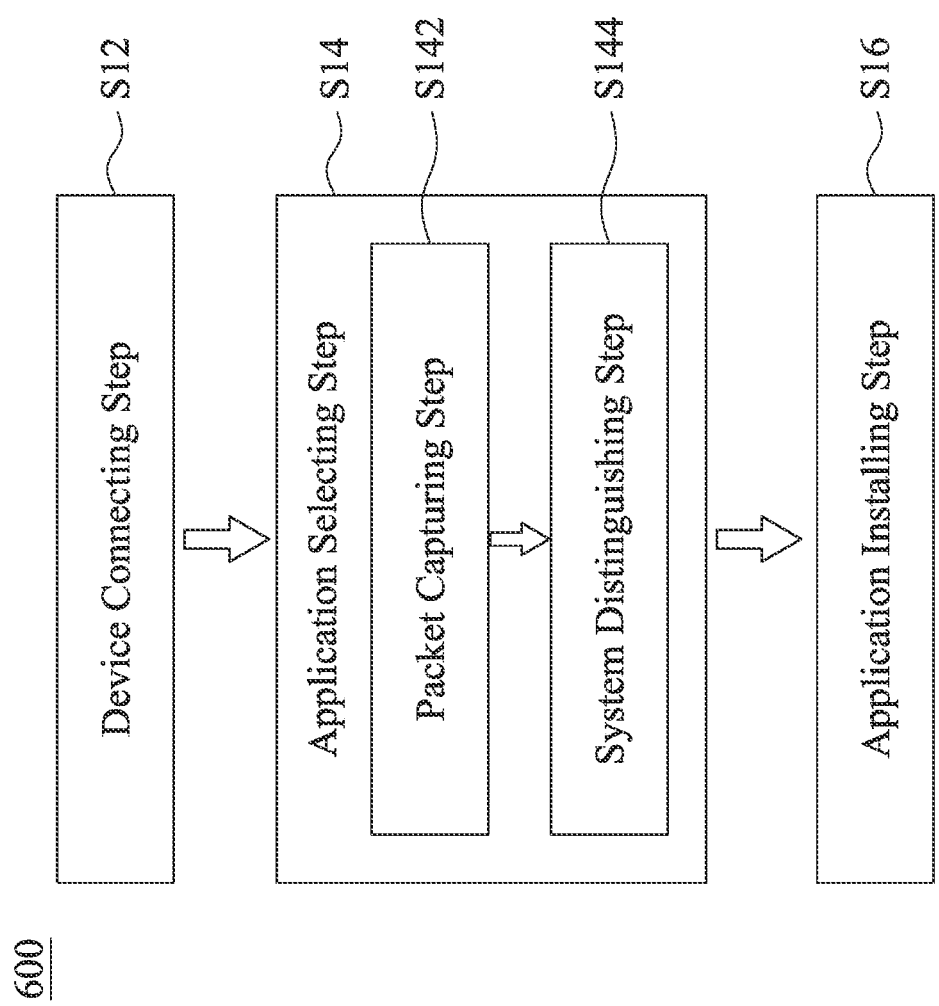
FIG. 4 is a schematic flow chart of a firmware update application installing method according to a third embodiment of the present disclosure.
Figure 5:
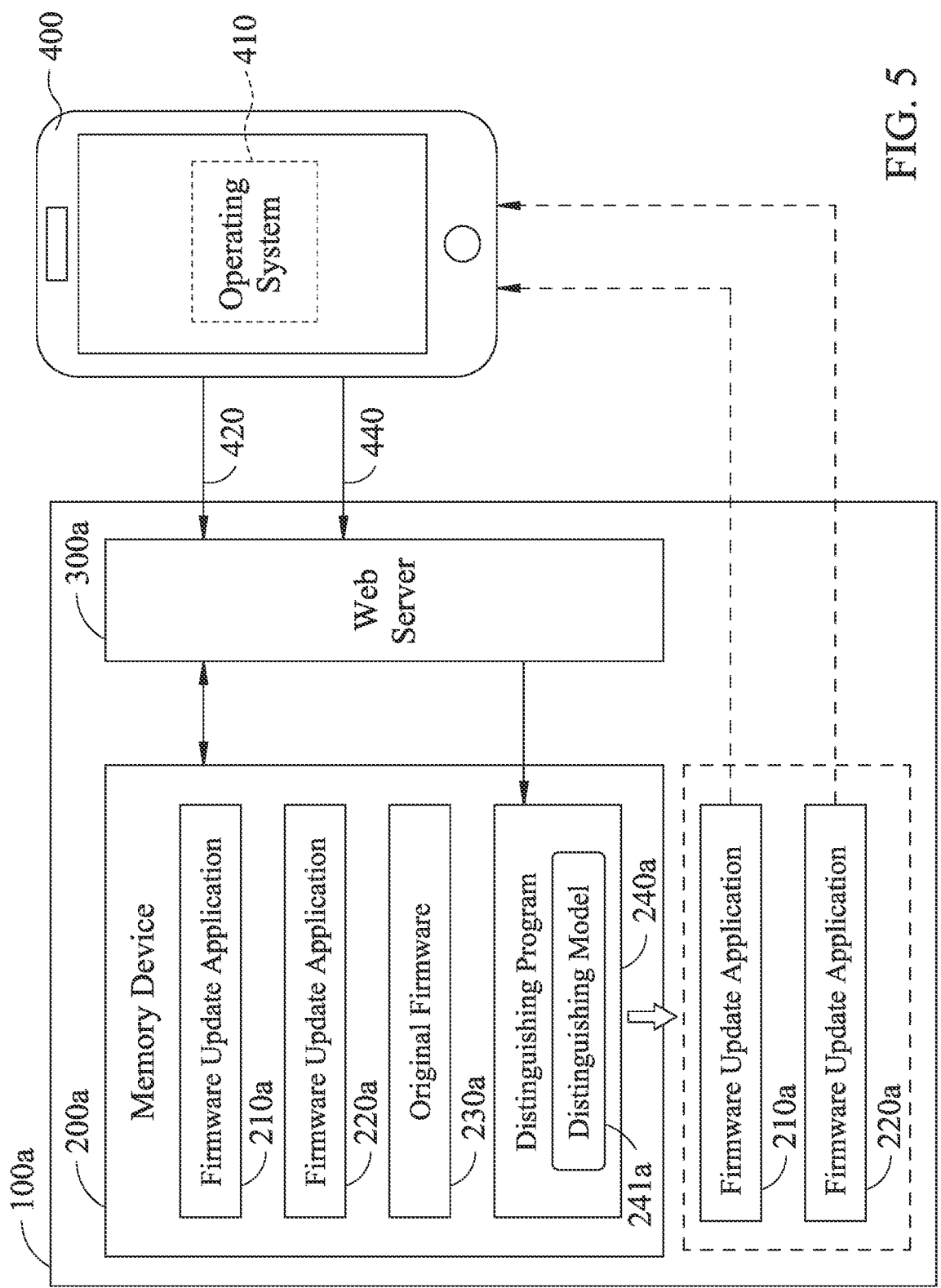
FIG. 5 is a schematic diagram illustrating an embedded device and a mobile device in the firmware update application installing method of FIG. 4.

Referring to FIG. 4 and FIG. 5, a firmware update application installing method 600 according to a third embodiment of the present disclosure can be implemented in an embedded device 100a for installing one of two firmware update applications 210a, 220a to the mobile device 400. The firmware update application installing method 600 includes performing a device connecting step S12, an application selecting step S14, and an application installing step S16, among which the device connecting step S12 and the application installing step S16 are the same as the device connecting step S02 and the application installing step S06 of the firmware update application installing method 500 of the second embodiment and therefore will not be described herein. Further, the embedded device 100a includes a memory device 200a and a web server 300a. The memory device 200a stores the two firmware update applications 210a, 220a, an original firmware 230a, and a distinguishing program 240a, and the distinguishing program 240a includes a distinguishing model 241a.

The difference between the third embodiment and the second embodiment is that the application selecting step S14 includes driving or configuring the distinguishing program 240a to select the firmware update application 210a having the APK file format or the firmware update application 220a having the IPA file format according to the file format which the operating system 410 of the mobile device 400 corresponds to. In specific, the web server 300a of the embedded device 100a is signally connected to the mobile device 400 and receives a network packet 440 from the mobile device 400. The application selecting step S14 further includes a packet capturing step S142 and a system distinguishing step S144.

The packet capturing step S142 includes driving or configuring the distinguishing program 240a to capture the network packet 440 from the web server 300a. The system distinguishing step S144 includes driving or configuring the distinguishing model 241a of the distinguishing program 240a to distinguish whether the operating system 410 is one of a first operating system and a second operating system based on the network packet 440 and generate a system distinguishing result. In the third embodiment, the first operating system can be the Android operating system, and the second operating system can be the iOS operating system, but the present disclosure is not limited thereto.

In the system distinguishing step S144, in response to the system distinguishing result being that the operating system 410 is the Android operating system, the distinguishing program 240a is configured to select the firmware update application 210a that conforms to APK file format according to the APK file format which the Android system corresponds to. Similarly, in response to the system distinguishing result being that the operating system 410 is iOS operating system, the distinguishing program 240a is configured to select the firmware update application 220a that conforms to IPA file format according to the IPA format which the iOS operating system corresponds to.

It is to be noted that the network packet 440 can include multiple packet data which can be used by the distinguishing model 241a of the distinguishing program 240a to distinguish or identify or determine whether the operating system 410 is the Android operating system or the iOS operating system. If the distinguishing model 241a is unable to determine which operating system is the operating system 410 through the packet information of the network packet 440, the system distinguishing result indicates identification failure. In turn, when the system distinguishing result is that the operating system 410 is not the Android operating system nor the iOS operating system, which means identification failure, the web server 300a is configured to receive a selection command 420 from the mobile device 400 and selects, among the two firmware update applications 210a, 220a stored in the memory device 200a, the firmware update application that conforms to the file format which the operating system 410 corresponds to according to the selection command 420. The selection command 420 is generated by the mobile device 400 based on information about the file format which the operating system 410 corresponds to. Hence, the firmware update application installing method 600 is able to automatically select the firmware update application having the file format which the operating system 410 corresponds to through the distinguishing program 240a identifying the operating system 410 of the mobile device 400, and also able to directly select the firmware update application according to the selection command 420. In turn, the goal of downloading and installing firmware update application to the mobile device 400 without having to access the phone app store is achieved, thereby preventing the users from downloading the wrong firmware update application.

Figure 6:
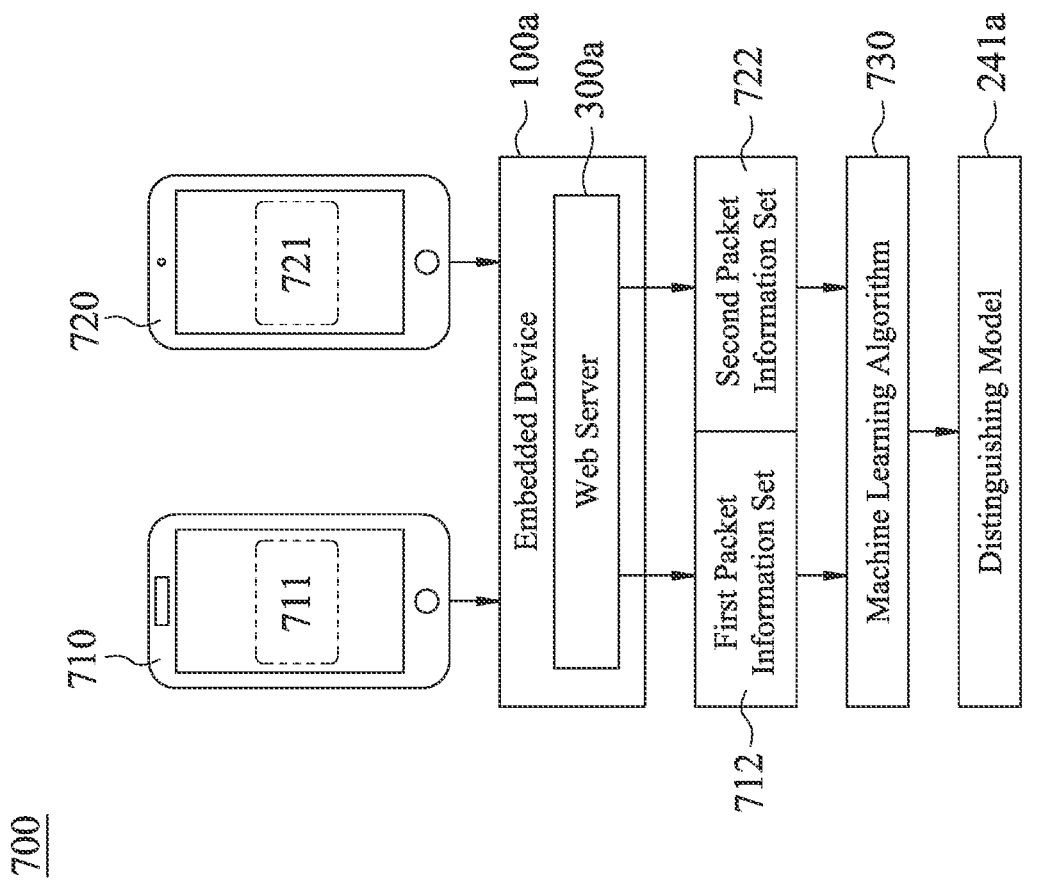
FIG. 6 is a schematic flow chart of a training procedure in the present disclosure.

Referring to FIG. 5 and FIG. 6, the distinguishing model 241a is obtained by training a machine learning algorithm 730 with a training procedure 700, and the training procedure 700 includes a first step, a second step, and a third step.

The first step is performed to drive the web server 300a of the embedded device 100a to sample a plurality of first network packets 711 from a first mobile device 710 having the first operating system, namely the Android operating system, and drive the web server 300a to sample a plurality of second network packets 721 from a second mobile device 720 having the second operating system, namely iOS operating system.

The second step is performed to drive the web server 300a to capture, from the plurality of first network packets 711, Android packet information and gather into a first packet information set 712, and to capture iOS packet data from the plurality of second network packets 721 and gather into a second packet information set 722.

The third step is performed to drive the web server 300a to process the first packet information set 712 and the second packet information set 722 according to the machine learning algorithm 730 to train the distinguishing model 241a. In particular, the machine learning algorithm 730 can be a supervised learning algorithm, an unsupervised learning algorithm, or a reinforcement learning algorithm, but the present disclosure is not limited thereto.

Figure 7:
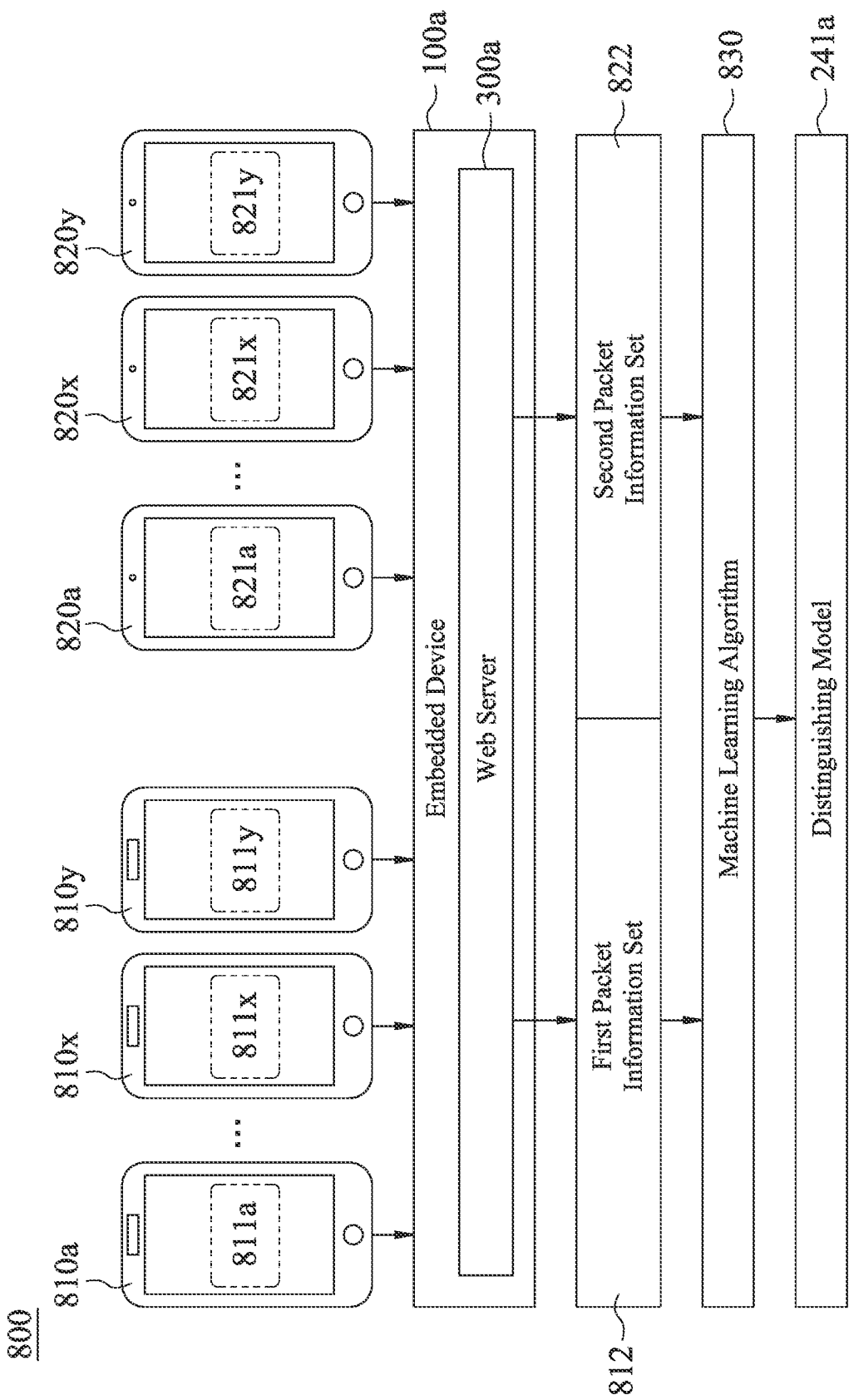
FIG. 7 is a schematic flow chart illustrating another training procedure in the present disclosure.

Referring to FIG. 5 and FIG. 7, the distinguishing model 241a is obtained through another training procedure 800 based on a machine learning algorithm 830, and the other training procedure 800 includes a first step, a second step, and a third step.

The first step is performed to drive the web server 300a of the embedded device 100a to sample a plurality of first network packets 811a, 811x, 811y respectively from a plurality of first mobile devices 810a, 810x, 810y having a first operating system, namely the Android operating system, and to drive the web server 300a to sample a plurality of second network packets 821a, 821x, 821y from a plurality of second mobile devices 820a, 820x, 820y having a second operating system, namely iOS operating system. It is to be noted that the first mobile devices 810a, 810x, 810y can be different models of Android cellular phones, respectively, and the second mobile device 820a, 820x, 820y can respectively be different models of iOS cellular phones.

The second step is performed to drive the web server 300a to capture Android packet information from the plurality of first network packets 811a, 811x, 811y and gather into a first packet information set 812, and to capture iOS packet information from the plurality of second network packets 821a, 821x, 821y and gather into a second packet information set 822.

The third step is performed to drive the web server 300a to process the first packet information set 812 and the second packet information set 822 based on the machine learning algorithm 830 to train the distinguishing model 241a. The machine learning algorithm 830 is the same as the machine learning algorithm 730 and so will not be described herein. Hence, the firmware update application installing method 600 of the present disclosure collects an immense amount of Android packet information and iOS packet information through the training procedures 700, 800 and trains the distinguishing model 241a with the machine learning method, so as to use the distinguishing model 241a for identifying the operating system 410 of the mobile device 400, and thereby automatically installing correct firmware update application to the mobile device 400.

In view of the above, the present disclosure encompasses the following advantages. First, the firmware update application corresponding to the mobile device is selected according to the selection command and installed in the mobile device, thereby bypassing the phone app store when downloading and installing the firmware update application in the mobile device. Second, through the distinguishing program identifying the operating system of the mobile device, the firmware update application having the file format corresponding to the operating system is selected, thereby preventing the user from downloading incorrect version of the firmware update application. Third, the firmware update application is selected and transmitted by the web server to the mobile device, thereby reducing the cost and time required for launching the firmware update application to the phone app store at developer end.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A firmware update application installing method for installing a firmware update application to a mobile device, and the firmware update application installing method comprising:

performing a device connecting step comprising connecting an embedded device to the mobile device, wherein the embedded device stores a plurality of the firmware update applications and a distinguishing program, the plurality of firmware update applications respectively conform to a plurality of file formats, the mobile device comprises an operating system, and the operating system corresponds to one of the plurality of file formats;

performing an application selecting step comprising configuring the distinguishing program to select one of the plurality of firmware update applications that conforms to the one of the plurality of file formats according to the one of the plurality of file formats which the operating system corresponds to; and performing an application installing step comprising configuring the embedded device to transmit the selected one of the plurality of firmware update applications to the mobile device for installation;

wherein the embedded device comprises a web server that is connected to the mobile device and receives a network packet from the mobile device, and the application selecting step further comprises:

performing a packet capturing step comprising configuring the distinguishing program to capture the network packet from the web server; and performing a system distinguishing step comprising configuring the distinguishing program to distinguish whether the operating system is one of a first operating system and a second operating system according to the network packet, and generate a system distinguishing result, wherein the one of the first operating system and the second operating system corresponds to the one of the plurality of file formats;

wherein the distinguishing program comprises a distinguishing model, and the distinguishing model is obtained by conducting a training procedure based on a machine learning algorithm;

wherein the training procedure comprises driving the embedded device to sample a plurality of first network packets from at least one first mobile device having the first operating system and a plurality of second network packets from at least one second mobile device having the second operating system and process the plurality of first network packets and the plurality of second network packets based on the machine learning algorithm to train the distinguishing model.

2. The firmware update application installing method according to claim 1, wherein, when the system distinguishing result is that the operating system is the one of the first operating system and the second operating system, the distinguishing program is configured to select the one of the plurality of firmware update applications that conforms to the one of the plurality of file formats according to the one of the plurality of file formats which the one of the first operating system and the second operating system corresponds to.

3. The firmware update application installing method according to claim 1, wherein, when the system distinguishing result is that the operating system is not the one of the first operating system and the second operating system, the web server is configured to receive a selection command from the mobile device and selects the one of the plurality of firmware update applications that conforms to the one of the plurality of file formats according to the selection command.

4. The firmware update application installing method according to claim 3, wherein the selection command is generated by the mobile device based on an information about the one of the plurality of file formats which the operating system corresponds to.

5. The firmware update application installing method according to claim 3, wherein the web server displays a system selection interface through the mobile device, the system selection interface comprises a first operating system option and a second operating system option, and the application selecting step further comprises:

configuring the mobile device to generate the selection command by picking one of the first operating system option and the second operating system option according to the one of the plurality of file formats which the operating system corresponds to.

6. The firmware update application installing method according to claim 1, wherein, when the operating system is an Android operating system, the selected one of the plurality of firmware update applications conforms to an APK file format; and when the operating system is an iOS operating system, the selected one of the plurality of firmware update applications conforms to an IPA file format.

7. The firmware update application installing method according to claim 1, wherein the embedded device and the mobile device are connected through a wireless network (Wi-Fi), Bluetooth, Zigbee, or Near Field Communication (NFC).

8. An embedded device, for installing a firmware update application to a mobile device having an operating system, the embedded device comprising:

a memory device, for storing a plurality of the firmware update applications, wherein the plurality of firmware update applications respectively conform to a plurality of file formats, and the operating system of the mobile device corresponds to one of the plurality of file formats; and a web server, connected to the memory device and for connecting to the mobile device;

wherein, when the web server is connected to the mobile device and receives a selection command from the mobile device, the web server, according to the selection command, selects one of the plurality of firmware update applications that conforms to the one of the plurality of file formats from the plurality of firmware update applications stored in the memory device, and transmits the selected one of the plurality of firmware update applications to the mobile device so the mobile device installs the selected one of the plurality of firmware update applications;

wherein the memory device stores a distinguishing program, when the web server is connected to the mobile device and receives a network packet from the mobile device, the distinguishing program captures the network packet from the web server and generates a system distinguishing result by distinguishing whether the operating system is one of a first operating system and a second operating system, the one of the first operating system and the second operating system corresponds to the one of the plurality of file formats;

wherein the distinguishing program comprises a distinguishing model, and the distinguishing model is obtained by conducting a training procedure based on a machine learning algorithm;

wherein the training procedure comprises driving the embedded device to sample a plurality of first network packets from at least one first mobile device having the first operating system and a plurality of second network packets from at least one second mobile device having the second operating system and process the plurality of first network packets and the plurality of second network packets based on the machine learning algorithm to train the distinguishing model.

9. The embedded device according to claim 8, wherein the selection command is generated by the mobile device based on an information about the one of the plurality of file formats which the operating system corresponds to.

10. The embedded device according to claim 8,
wherein, when the system distinguishing result is that the operating system is the one of the first operating system and the second operating system, the distinguishing program selects the one of the plurality of firmware update applications that conforms to the one of the plurality of file formats according to the one of the plurality of file formats which the one of the first operating system and the second operating system corresponds to;
wherein, when the system distinguishing result is that the operating system is not the one of the first operating system and the second operating system, the distinguishing program receives the selection command and selects the one of the plurality of firmware update applications that conforms to the one of the plurality of file formats according to the selection command.

11. The embedded device according to claim 10, wherein the web server displays a system selection interface through the mobile device, the system selection interface comprises a first operating system option and a second operating system option, the mobile device generates the selection command by picking one of the first operating system option and the second operating system option according to the one of the file formats which the operating system corresponds to.

12. The embedded device according to claim 8, wherein,
when the operating system is an Android operating system, the selected one of the plurality of firmware update applications conforms to an APK file format; and
when the operating system is an iOS operating system, the selected one of the plurality of firmware update applications conforms to an IPA file format.

13. The embedded device according to claim 8, wherein the embedded device and the mobile device are connected through a wireless network (Wi-Fi), Bluetooth, Zigbee, or Near Field Communication (NFC).

14. The embedded device according to claim 8, wherein the memory device stores an original firmware, and the original firmware is updated through the selected one of the plurality of firmware update applications installed in the mobile device.

15. The firmware update application installing method according to claim 1, wherein a number of the at least one first mobile device is one, and a number of the at least one second mobile device is one.

16. The firmware update application installing method according to claim 1, wherein a number of the at least one first mobile device is plural, and a number of the at least one second mobile device is plural.

17. The firmware update application installing method according to claim 16, wherein the plurality of first mobile devices are different models of Android cellular phones, and the plurality of second mobile devices are different models of iOS cellular phones.

18. The embedded device according to claim 8, wherein a number of the at least one first mobile device is one, and a number of the at least one second mobile device is one.

19. The embedded device according to claim 8, wherein a number of the at least one first mobile device is plural, and a number of the at least one second mobile device is plural.

20. The embedded device according to claim 19, wherein the plurality of first mobile devices are different models of Android cellular phones, and the plurality of second mobile devices are different models of iOS cellular phones.

* * * * *